United States Patent Office 2,918,475
Patented Dec. 22, 1959

2,918,475

PROCESS FOR THE MANUFACTURE OF WATER-SOLUBLE SALTS OF SULPHURIC ACID ESTERS OF LEUCO VAT DYESTUFFS OF THE ANTHRAQUINONE SERIES

Walter Oppliger and Eduard Peyer, Basel, and Hans Schenkel, Neue Welt, near Basel, and Karl Glenz, Binningen, near Basel, Switzerland, assignors to Durand & Huguenin A.G., Basel, Switzerland, a Swiss firm No Drawing. Application October 22, 1956
Serial No. 617,237

Claims priority, application Switzerland
October 25, 1955

7 Claims. (Cl. 260—316)

It is known that vat dyestuffs can be converted into the sulphuric acid ester salts of their leuco derivative by treating the vat dyestuffs with substances yielding sulphur trioxide or with sulphur trioxide itself and with metals in the presence of tertiary bases (see British Patents Nos. 247,787 and 251,491). These processes can also be carried out in the presence of diluents, preferably those which do not participate in the reaction, such as for instance acetone and nitrobenzene (cf. British Patent No. 278,399). Various tertiary bases such as pyridine, quinoline and dimethylaniline have been proposed for carrying out this reaction; in practice, however, only pyridine and certain homologues thereof are suitable.

It is also known that these processes, when applied to a large number of vat dyestuffs of the anthraquinone series, lead to poor yields and often only traces of the leuco sulphuric acid ester salts are obtained. In some instances, even though water-soluble products are obtained, they cannot be reconverted or can only be partially reconverted on the fiber into the original vat dyestuff by the methods known for applying ester salts, the leuco vat dyestuffs thus being of no use. It is also known that the ketoenol equilibrium of vat dyestuffs of the anthraquinone series is substantially shifted towards the enol compound by means of strong alkalis (Joachim Müller, Melliand, 1947, pages 95 and 136).

It has now been found that vat dyestuffs of the anthraquinone series, which are difficult to esterify, can be converted into their water-soluble leuco sulphuric acid ester salts.

The main object of the present invention thus provides a new method for the manufacture of a water-soluble salt of a sulphuric acid ester of a leuco vat dyestuff of the anthraquinone series, which dyestuff gives an ester yield of less than 25% relative to the weight thereof when esterified by means of a mixture of pyridine base and chlorosulphonic acid (10:1 by weight) in the presence of a metal powder, the new method comprising reacting the vat dyestuffs in the presence of at least one finely divided metal, selected from the group consisting of iron, cobalt, zinc, copper and copper alloys with a member of the group consisting of chlorosulphonic acid and an equivalent mixture of sulphur trioxide and hydrogen chloride in the presence of a mixture consisting of at least one pyridine base selected from the group consisting of pyridine, α-, β- and γ-picoline, 2:4- and 2:6-lutidine, 2-methyl-5-ethyl-pyridine, and of at least one tertiary amine of the general formula

in which all the four free valences are occupied by carbon atoms of radicals selected from the group consisting of monovalent saturated hydrocarbon radicals each occupying any one of the said free valences and of divalent saturated hydrocarbon radicals having two end carbon atoms occupying any one pair of the said free valences, any of the said monovalent and divalent saturated hydrocarbon radicals which are bound solely to the nitrogen atom each containing at most seven carbon atoms and any two monovalent radicals so bound containing together at least three and at most eleven carbon atoms, any of the said monovalent and divalent saturated hydrocarbon radicals which are bound solely to the carbon atom of the formula each containing at most six carbon atoms and any two monovalent radicals so bound containing together at least two and at most eight carbon atoms, the said pyridine base-tertiary amine mixture containing 10–60 percent by weight of tertiary amine component, and subsequently converting the resulting sulphuric acid ester compound into a water-soluble ester salt.

According to a preferred embodiment of this invention the said pyridine base-tertiary amine mixture contains 15 to 35 percent by weight of the tertiary amine component.

Among the tertiary amines defined above there may be mentioned, more especially, those of the following general formulae:

(I) 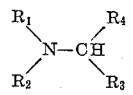

in which $R_1$, $R_3$ and $R_4$ represent methyl, ethyl, propyl or butyl groups, and $R_2$ represents an ethyl, propyl, isopropyl or butyl group. The use of amines of the above formula is illustrated in Examples 7 to 14 and Table I.

(II) 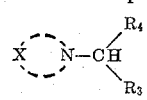

in which X represents a pentamethylene or tetramethylene group which may be substituted by methyl, and $R_3$ and $R_4$ represent methyl, ethyl, propyl or butyl groups. The use of amines of the above formula is illustrated in Examples 15 to 21 and Table II.

(III) 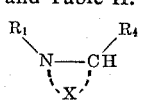

in which $R_1$ represents a methyl, ethyl, propyl or butyl group, $R_4$ represents a methyl group, and X represents a tetramethylene group which may be substituted by methyl. The use of amines of the above formula is illustrated in Examples 22 to 27 and Table III.

(IV) 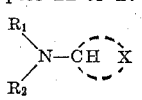

in which X represents a pentamethylene group which may be substituted by methyl, $R_1$ represents a methyl, ethyl, propyl or butyl group, and $R_2$ represents an ethyl, propyl, isopropyl, butyl or cyclohexyl group. The use of amines of the above formula is illustrated in Examples 1 to 6 and 28 to 41 and Table IV.

(V) 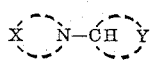

in which X and Y represent pentamethylene or tetramethylene groups which may be substituted by methyl. The use of amines of the above formula is illustrated in Examples 42 to 48 and Table V.

As vat dyestuffs of the anthraquinone series which are difficult to esterify there are to be understood those of which the sulphuric acid ester salts can be obtained by the usual methods of esterification only in small yields, that is to say, yields which are insufficient for commercial purposes or are trace-like, or in the form of products which cannot be converted or can be converted only partially into the original dyestuff by the usual method of application. For the purposes of the present invention, the anthraquinone vat dyestuffs in question are those which are difficult to esterify as determined by the test given in British specification No. 719 621. Vat dyestuffs of the anthraquinone series which are difficult to esterify are found, for example, in the following classes:

(1) 1-aroylaminoanthraquinones which contain as a substituent in the 4-, 5- or 8-position an acylamino or alkoxy group or halogen atom, and especially diaroylaminoanthraquinones and their derivatives containing substituents in the benzene nuclei.

(2) Anthraquinone-carbazoles.

(3) Anthrimides.

The chlorosulphonic acid may be introduced into the reaction mixture as such or partially or completely in the form of an equivalent mixture of sulphur trioxide and hydrogen chloride or in the form of a sulphur trioxide addition product and a hydrochloride of one or both of the bases used.

The pyridine bases may be used either in the pure form or in the form of a commercial product.

Similarly the tertiary amines defined above may be used in the pure form or in the form of a commercial product, and, as stated above, two or more of them may be used.

The use of a mixture of at least one pyridine base and at least one tertiary amine containing the atomic grouping

in suitable relative proportions is of critical importance in the present process. Thus, in order to obtain commercially valuable results it is essential that the proportion of the said tertiary amine or amines in the mixture of organic bases should be at least 10 and at most 60 percent on the weight of the mixture. In order to obtain an optimum yield of sulphuric acid ester salt, the proportion of the tertiary amine or amines must be chosen within the aforesaid proportions depending on the behaviour of the particular vat dyestuff used.

In carrying out the process it is not essential to use from the outset a mixture of a pyridine base and one or more of the said tertiary amines, so that for example, one of the components of the mixture of bases may be reacted with chlorosulphonic acid and then mixed with a suitable quantity of the other component. It is essential only that, before the commencement of the esterification reaction, the two bases should be present in suitable relative proportions. It will be understood that for the esterification it is necessary to use at least two molecular proportions of chlorosulphonic acid for each anthraquinone nucleus present in the vat dyestuff.

The proportion of the mixture of organic bases must be such as to provide at least 1.4 molecular proportions of the said tertiary amine or amines for every two molecular proportions of chlorosulphonic acid used, except that if less than four molecular proportions of the acid are used not less than two molecular proportions of the said amine should be present for every two molecular proportions of the acid. However, in order to obtain optimum results, it will usually be necessary to use a proportion of chlorosulphonic acid, and correspondingly of the basic mixture several times greater than the minimum proportions mentioned above. The most favourable excess to use depends on the properties of the particular dyestuff to be esterified, and can easily be determined by preliminary tests.

In the present process there is used as the metal finely divided iron, cobalt, zinc, copper or a copper alloy. By the expression "finely divided" there is to be understood, for example, the powdered form hitherto used, and preferably a fineness such that the metal passes through a 150–200 mesh sieve (see Handbook of Chemistry and Physics, 31st edition, page 2669). The proportion of the metal should be at least 1.5, and preferably at least 2, atomic proportions for each anthraquinone nucleus present in the vat dyestuff. However, it will usually be of advantage to use a proportion considerably in excess of the minimum proportion.

In one form of the process the reaction is carried out in the presence of not only one of the said metals, but in the presence of a plurality of these metals. It is of special advantage from the practical point of view to use iron, owing to its low cost.

The process may, if desired, be carried out with the exclusion of oxygen. The metal may be subjected to an etching treatment prior to the esterification process and in the absence of the vat dyestuff to be esterified. Such etching treatment may be carried out as described in British specification Nos. 745,088 and 745,365.

The sulphuric acid ester compound resulting from the esterification is converted into a water-soluble ester salt by a method in itself known, for example, by treatment with a suitable base or by any other conventional method. Especially suitable water-soluble sulphuric acid ester salts are the lithium, sodium, potassium, ammonium and hydroxyalkylamine salts.

The following examples illustrate the invention, the parts being by weight:

EXAMPLE 1

A mixture of 150 parts of commercial α-picoline boiling at 125–128° C. and 55 parts of diethly-cyclohexylamine is mixed, while stirring and cooling, with 20 parts of sulphonic acid, 20 parts of finely ground and dry 1-(4'- dimethylsulphamidobenzoylamino)-4-benzoylaminoanthraquinone as well as 15 parts of copper powder are then added, and the whole is heated for 4 hours at 50° C. while stirring. The reaction mixture may be worked up as follows: It is introduced into 1500 parts of a sodium carbonate solution of 4% strength and the mixture of bases is distilled off under reduced pressure at 50° C. After removing the bases, the clear solution is decanted from the precipitated oil, the oil is dissolved in 200 parts of ethyl alcohol and stirred with 15 parts of sodium hydroxide solution of 30% strength and 500 parts of water for 30 minutes at 35° C. The sulphuric acid ester of 1-(4'-dimethylsulphamidobenzoylamino)-4-benzoylaminoanthraquinone is recovered from the solution, which remains after filtering off the copper residue, directly or after removal of the alcohol by distillation under reduced pressure at 35° C. in the form of its sodium salt by salting out with sodium chloride. The pale yellow crystalline sulphuric acid ester salt is easily soluble in water and yields the original dyestuff when subjected to oxidative splitting The yield of sulphuric acid ester salt amounts to 30%. When applied to textiles by known methods it yields red tints.

If in this example the copper powder is replaced by the same quantity of brass powder, the sulphuric acid ester salt is obtained in a yield of at least 85%.

EXAMPLE 2

20 parts of chlorosulphonic acid are introduced into a mixture of 178 parts of α-picoline and 42 parts of diethylcyclohexylamine while cooling and stirring and replacing the oxygen present over the reaction mass by a nitrogen atmosphere, whereupon 10 parts of 1:5-dibenzoylaminoanthraquinone and 7 parts of brass powder are added. The suspension is heated for 4 hours at 55° C. while stirring, and then the reaction mixture is poured into a solution of 42 parts of sodium carbonate in 1500 parts of water. The product is worked up in a manner analogous to that described in Example 1. The yield of the sulphuric acid ester salt is 85 percent.

If the reaction mass is agitated in a suitable way, i.e.

in such a way that substantially no oxygen is introduced into the reaction mass, the reaction may take place without replacing the air present in the reaction vessel by a nitrogen atmosphere.

When applied to textiles the product yields gold-yellow tints which are distinguished by pronounced properties of wet fastness.

Practically the same yield is obtained by using, instead of 1:5 - dibenzoylaminoanthraquinone, 1-(2'-methylbenzoylamino) - 5-benzoylaminoanthraquinone, 1:5-di-(2'-methylbenzoylamino)-anthaquinone, 1:5-di-(2':4'-dichlorobenzoyl)-aminoanthraquinone or the vat dyestuff prepared as described in the first paragraph of Example 1 of French Patent No. 908,768.

EXAMPLE 3

20 parts of chlorosulphonic acid are added to a mixture of 160 parts of α-picoline and 40 parts of diethyl-cyclohexylamine while stirring and cooling. 10 parts of carbazolized di-(5'-benzoylamino-1'-anthraquinonyl)-2:8-diamino-chrysene and 7 parts of brass powder are then introduced and the whole is heated for 5 hours at 50° C. The reaction mixture is then poured into 1500 parts of water, which contains 40 parts of sodium carbonate, and the mixture of bases is distilled off at 50° C. The product is worked up in a manner analogous to that described in Example 1. The yield of the sulphuric acid ester salt is 83 percent.

Instead of carbazolized di-(5'-benzoylamino-1'-anthraquinonyl)-2:8-diaminochrysene, there may be used carbazolized 8':8''-dibenzoylamino-1:4:1':1''-trianthrimide, the carbazolized vat dyestuff prepared as described in Example 5 of French Patent No. 839,529, the carbazolized vat dyestuff obtained as described in Example 9 of French Patent No. 843,140 of the vat dyestuff No. 39, on page 514 in volume 65 of the Journal of the Society of Dyers and Colorists.

EXAMPLE 4

30 parts of chlorosulphonic acid and 60 parts of diethyl-cyclohexylamine are introduced, while cooling and stirring, into 240 parts of commercial α-picoline boiling at 125–128° C. After the addition of 20 parts of iron powder and 15 parts of 1:5-dibenzoylaminoanthraquinone, the mixture is heated for 5–6 hours at 55° C., while stirring. The reaction mixture may be worked up as follows:

The mixture is introduced into a solution of 53 parts of calcined sodium carbonate in 450 parts of water, and the mixture of bases is distilled off under reduced pressure at 50° C. The aqueous solution is decanted from the precipitated oil, the oil is dissolved in 150 parts of alcohol and stirred with 30 parts of sodium hydroxide solution of 30 percent strength and 370 parts of water for 30 minutes at 35° C. After filtering the solution to remove the iron residue therefrom, the sulphuric acid ester salt of leuco-1:5-dibenzoylaminoanthraquinone can be recovered by salting out with sodium chloride in a yield of 80–90 percent.

Instead of 20 parts of iron powder, there may be used 20 parts of a mixture of 15 parts of iron powder and 5 parts of cobalt powder.

Furthermore, instead of 20 parts of iron powder there may be used 20 parts of a mixture of 10 parts of iron powder and 10 parts of brass powder.

EXAMPLE 5

20 parts of chlorosulphonic acid and 45 parts of di-ethyl-(2-methylcyclohexyl)-amine are introduced into 170 parts of commercial α-picoline boiling at 125–128° C., while cooling and stirring. After the addition of 7 parts of brass powder and 10 parts of finely ground 1:5-dibenzoylaminoanthraquinone, the whole is heated for 5 hours at 55° C. while stirring. The reaction mixture may be worked up as follows:

The reaction mixture is introduced into 1500 parts of a sodium carbonate solution of 4 percent strength and the mixture of bases is distilled off under reduced pressure at 50° C. The aqueous solution is decanted from the precipitated oil, the oil is dissolved in 150 parts of alcohol and stirred with 30 parts of sodium hydroxide solution of 30 percent strength and 370 parts of water for 30 minutes at 35° C. The solution is filtered to remove the residues of brass, and the sulphuric acid ester of leuco 1:5-dibenzoylaminoanthraquinone can be recovered by salting out with sodium chloride in a yield of 80–90 percent.

When the resulting sulphuric acid ester salt is applied to textiles gold-yellow tints are obtained, which are distinguished by excellent properties of wet fatness.

Instead of 7 parts of brass powder, there may be used 7 parts of copper powder, 10 parts of iron powder or 10 parts of a mixture of 5 parts of brass powder and 5 parts of iron powder.

Furthermore, instead of 45 parts of diethyl-(2-methylcyclohexyl)-amine, there may be used 45 parts of diethyl-(3-methylcyclohexyl)-amine, 45 parts of diethyl-(4-methylcyclohexyl)-amine, 45 parts of a mixture of these diethyl-(monomethylcyclohexyl)-amines or 45 parts of a mixture of diethylcyclohexylamine and diethyl-(monomethylcyclohexyl)-amine (for instance 1:44; 22.5:22.5 or 44:1).

EXAMPLE 6

Into 160 parts of technical 2-methyl-5-ethylpyridine, B.P. 176–178° C., are subsequently introduced, while cooling and stirring, 20 parts of chlorosulphonic acid, 25 parts of iron powder and 56 parts of diethylcyclohexylamine. After addition of 10 parts of 1:5-dibenzoyl-aminoanthraquinone the whole mixture is heated for 5 to 6 hours at 67–69° C., while stirring.

The reaction mixture can be worked up in the following way:

It is introduced into a solution of 35.5 parts of calcined sodium carbonate in 600 parts of water and the mixture of bases is distilled off at a bath temperature of 50° C. under reduced pressure. The aqueous solution is decanted from the separated oil, the oil being then dissolved in 100 parts of alcohol and stirred for 30 minutes at 40° C. with 20 parts of a 30% sodium hydroxide solution and 250 parts of water. After having freed the solution by filtration from iron residues and after having concentrated the solution under reduced pressure at a temperature of 50° C. the sulphuric acid ester of leuco 1:5-dibenzoylaminoanthraquinone can be recovered by salting out with sodium chloride in a yield of more than 90 percent.

If in the above example the quantity of 2-methyl-5-ethyl-pyridine is increased from 160 parts to 224 parts, the reaction procedure being otherwise the same as in this example, one also obtains the sulphuric acid ester of leuco 1:5-dibenzoylaminoanthraquinone in a good yield.

EXAMPLE 7

20 parts of chlorosulphonic acid are introduced, while cooling and stirring, into 160 parts of α-picoline. After the addition of 25 parts of iron powder the whole is stirred for 15 minutes at 18–20° C. 41.5 parts of diethyl-isopropylamine and then 10 parts of 1:5-dibenzoylamino-anthraquinone are added while cooling. The whole is heated at 55–57° C. until the dyestuff disappears, which takes about 5 hours. The reaction mixture is worked up as follows.

It is introduced into a solution of 36 parts of sodium carbonate in 600 parts of water, and the bases are distilled off under reduced pressure at a bath temperature of 40–45° C.

The sodium salt of the sulphuric acid ester of leuco-1:5-dibenzoylaminoanthraquinone is obtained in a yield of 83 percent by adding sodium chloride to the filtered solution.

The same results can be obtained by using, instead of 25 parts of iron powder, 10 parts of copper powder or 10 parts of brass powder.

EXAMPLE 8

10 parts of chlorosulphonic acid are introduced into 189 parts of α-picoline, while cooling and stirring. After the addition of 8 parts of brass powder, the whole is stirred for 15 minutes at 18–20° C., and then 21 parts of diethyl-isopropylamine and subsequently 5 parts of 1:5-dibenzoylamino-anthraquinone are added, while cooling. The whole is heated at 55–57° C. until the dyestuff disappears, which takes about 5 hours. The reaction mixture is worked up as follows:

It is introduced into a solution of 18 parts of sodium carbonate in 500 parts of water and the bases are distilled off under reduced pressure at a bath temperature of 40–45° C. The precipitated diethyl-isopropylamine salt of the sulphuric acid ester of the leuco vat dyestuff is separated and stirred for 40 minutes in a solution of 3 parts of sodium hydroxide in 12 parts of water and 50 parts of alcohol at 40° C. The solution is filtered and concentrated by evaporation, and by the addition of sodium chloride the sodium salt of the sulphuric acid ester of leuco-1:5-dibenzoylaminoanthraquinone is obtained in a yield of 78 percent.

EXAMPLE 9

10 parts of chlorosulphonic acid are introduced into 80 parts of γ-picoline, while cooling and stirring. After the addition of 7.5 parts of brass powder, the whole is stirred for 30 minutes at 18–20° C. and then 23.2 parts of ethyl-diisopropylamine and subsequently 5 parts of 1:4 - dibenzoylamino - anthraquinone are added. The whole is heated to 40–45° C. until the dyestuff has disappeared, which takes about 30 minutes. By working up the mixture as described in Example 8 the sodium salt of the sulphuric acid ester of leuco 1:4-dibenzoylaminoanthraquinone is obtained in a yield of 76 percent.

EXAMPLE 10

10 parts of chlorosulphonic acid are added to 80 parts of 2:6-lutidine, while cooling and stirring. After the addition of 8 parts of copper powder the whole is stirred for 30 minutes at 15–20° C. and then 23.2 parts of ethyl-diisopropylamine and subsequently 5 parts of 1:4-dibenzoylamineo-anthraquinone are added while cooling. The whole is heated to 55–57° C. until the dyestuff disappears, which takes about 4 hours.

By working up as described in Example 8, there is obtained the sodium salt of the sulphuric acid ester of leuco-1:4-dibenzoylaminoanthraquinone in a yield of 90 percent.

By using, instead of the copper powder, 75 parts of brass powder, and, instead of 2:6-lutidine, 80 parts of 2-methyl-5-ethyl-pyridine, and otherwise working in the manner described above, there is obtained the sodium salt of the sulphuric acid ester of leuco-1:4-dibenzoylaminoanthraquinone in a yield of 84 percent.

EXAMPLE 11

10 parts of chlorosulphonic acid are added to 80 parts of 2-methyl-5-ethylpyridine, while stirring and cooling. After the addition of 7.5 parts of brass powder, the whole is stirred for 30 minutes at 18–20° C., and then 26 parts of diethyl-3-amylamine and subsequently 5 parts of 1:4-dibenzoylaminoanthraquinone are added, while cooling. The whole is heated at 40–45° C. until the dyestuff disappears, which takes about ½ hour.

By working up as described in Example 8 there is obtained the sodium salt of the sulphuric ester of leuco-1:4-dibenzoylaminoanthraquinone in a yield of 82 percent.

By using in this example, instead of diethyl-3-amylamine, 33 parts of diethyl-4-heptylamine or 36 parts of diethyl-5-nonylamine, the sodium salt of the sulphuric acid ester of leuco-1:4-dibenzoylaminoanthraquinone is obtained in a yield of 87 percent or 80 percent, respectively.

EXAMPLE 12

42 parts of diethyl-isopropylamine and subsequently 20 parts of chlorosulphonic acid are introduced into 48 parts of α-picoline while cooling and stirring. There are also added 15 parts of copper powder and 10 parts of 1-(4' - dimethylsulphonamido - benzoylamino) - 4 - (4"-chlorobenzoylamino)-anthraquinone (see the first paragraph of Example 1 of British specification No. 636,691) are added, and the whole is heated at 55–57° C. until the dyestuff disappears, while takes about 1½ hours. The reaction mixture is introduced into a solution of 36 parts of sodium carbonate in 700 parts of water. The bases are distilled off under reduced pressure at a bath temperature of 40–45° C. The precipitated base salt of the sulphuric acid ester is separated, and heated in a solution of 4 parts of sodium hydroxide in 250 parts of water and 100 parts of alcohol for 20 minutes at 40° C., while stirring. The solution is filtered and concentrated, and by the addition of sodium chloride there is obtained the sodium salt of the sulphuric acid ester of leuco-1-(4'-dimethylsulphonamido - benzoylamino) - 4 - (4" - chlorobenzoylamino)-anthraquinone, in a yield of 76 percent.

EXAMPLE 13

25 parts of chlorosulphonic acid and subsequently 44.6 parts of diethyl-isopropylamine are introduced into 100 parts of α-picoline, while cooling and stirring. After the addition of 10 parts of carbazolysed di-(5'-benzoylamino-1'-anthraquinonyl)-2:8-diaminochrysene (see the first paragraph of Example 7 of French specification No. 839,529) 5 parts of zinc are added in portions and the temperature is maintained at 30–33° C. When the dyestuff has disappeared, the mixture is filtered to remove the excess of zinc, and the reaction mixture is introduced into a solution of 45 parts of sodium carbonate in 600 parts of water. The bases are distilled off under reduced pressure at a bath temperature of 40–45° C. The precipitated base salt of the sulphuric acid ester is separated and heated in a solution of 8 parts of sodium hydroxide in 250 parts of water and 100 parts of alcohol for 20 minutes at 50–55° C. The solution is filtered and concentrated, and by the addition of sodium chloride the sodium salt of the sulphuric acid ester of di-(5'-benzoylamino-1'-anthraquinonyl)-2:8-diaminochrysene is obtained in a yield of 87 percent.

By using instead of the above dyestuff, 10 parts of carbazolysed 8':8"-dibenzoylamino-1:4:1':1"-trianthrimide (see Example 1 of French specification No. 861,921) the sulphuric acid ester salt is obtained in a yield of 80 percent.

EXAMPLE 14

10 parts of chlorosulphonic acid are introduced into 80 parts of α-picoline, while cooling and stirring. After the addition of 12 parts of ice, the whole is stirred for 30 minutes at 18–20° C. 11.6 parts of ethyl-n-propyl-isopropylamine and 10.4 parts of diethyl-isopropylamine and subsequently 5 parts of carbazolysed di-(5'-benzoylamino-1'-anthraquinonyl)-2:8-diaminochrysene are added while cooling.

The whole is heated at 55–57° C. until the dyestuff disappears, which takes about 5 hours. The reaction mixture is introduced into a solution of 18 parts of sodium carbonate in 500 parts of water, and the bases are distilled off under reduced pressure at a bath temperature of 40–45° C. The precipitated base salt of the sulphuric acid ester is separated and stirred for 45 minutes in a solution of 4 parts of sodium hydroxide in 130 parts of water and 50 parts of alcohol at 50–55° C.

The solution is filtered and concentrated, and by the addition of sodium chloride there is obtained the sodium salt of the sulphuric acid ester of 1-(5'-benzoylamino-1'- anthraquinonyl)-2:8-diaminochrysene in a yield of 94 percent.

Further examples of starting materials and the results obtained therewith by the procedure described in the preceding examples are given in the following table:

Vat dyestuff I=1:5-dibenzoylaminoanthraquinone
Vat dyestuff II=1:4-dibenzoylaminoanthraquinone
Vat dyestuff III=1 - (4' - dimethylsulphamidobenzoylamino)-4-benzoylaminoanthraquinone
Vat dyestuff IV=1 - (4' - dimethylsulphamidobenzoylamino)-1-(4''-chlorobenzoylamino)-anthraquinone
Vat dyestuff V—carbazolised di-(5'-benzoylamino-1'-anthraquinonyl)-2:8-diaminochrysene
Vat dyestuff VI=carbazolised 8':8'' - dibenzoylamino-1:4:1':1''-trianthrimide
Vat dyestuff VII=anthrimide from 1:3-dichloro-2-methylanthraquinone and 1:4-monobenzoyl-diaminoanthraquinone
Me=brass Table I

| Base of the formula $R_1 \diagdown N-CH \diagup R_4$ $R_2 \diagup \diagdown R_3$ | Pyridine base | Vat dyestuff | Metal Yield, percent |
|---|---|---|---|
| Methyl-ethyl-isopropylamine | α-picoline | II | Fe, 90 |
| Do | do | II | Cu, 86 |
| Diethyl-isopropylamine | do | II | Fe, 94 |
| Do | α-picoline-2+methyl-5-methyl-pyridine 1:1 | II | Me, 62 |
| Do | pyridine+α+β+γ-picoline, 1:1:1:1 | II | Me, 52 |
| Do | pyridine | I | Cu, 76 |
| Do | α-picoline | I | Co, 68 |
| Do | β-picoline | I | Me, 56 |
| Do | 2:4-lutidine | I | Me, 55 |
| Do | pyridine | V | Fe, 92 |
| Do | α-picoline | VII | Fe, 82 |
| Do | 2:6-lutidine | III | Me, 80 |
| Ethyl-n-propyl-isopropylamine | α-picoline | II | Fe, 92 |
| Do | do | I | Cu, 90 |
| Ethyl-n-butyl-isopropylamine | do | II | Fe, 92 |
| Methyl-diisopropylamine | do | II | Cu, 93 |
| Do | do | I | Me, 90 |
| Do | pyridine | I | Fe, 82 |
| Do | α-picoline | III | Fe, 78 |
| Ethyl-diisopropylamine | do | II | Fe, 90 |
| Do | 2:4-lutidine | I | Me, 82 |
| Do | 2:6-lutidine | III | Me, 78 |
| Do | α-picoline | V | Fe, 86 |
| Do | do | VI | Me, 66 |
| Do | do | II | Me, 92 |
| Do | do | I | Fe, 91 |
| Do | do | III | Fe, 86 |
| Do | do | V | Cu, 92 |
| Diethyl-sec.-butylamine | do | I | Fe, 63 |
| Diethyl-3-amylamine | do | II | Fe, 85 |
| Do | do | II | Co, 73 |
| Do | do | I | Me, 90 |
| Diethyl-4-heptylamine | do | II | Fe, 88 |
| Do | do | II | Fe, 87 |
| Do | 2-methyl-5-ethyl-pyridine | I | Fe, 75 |
| Do | α-picoline | IV | Cu, 76 |
| Diethyl-5-nonylamine | do | I | Fe, 86 |
| Do | do | II | Cu, 82 |
| Diethyl - isopropylamine, Diethyl-3-amylamine, 1:1 | do | II | Me, 90 |

EXAMPLE 15

10 parts of chlorosulphonic acid are introduced into 80 parts of α-picoline while cooling and stirring. After the addition of 13 parts of iron powder the whole is heated for 30 minutes at 18–20° C. There are also added, while cooling, 25.5 parts of N-isopropyl-2-methyl-piperidine and subsequently 5 parts of 1:5-dibenzoylamino-anthraquinone. The whole is heated at 55–57° C. until the dyestuff disappears, which takes about 6 hours.

The reaction mixture is worked up as follows: It is introduced into a solution of 18 parts of sodium carbonate in 500 parts of water and the bases are distilled off under reduced pressure at a bath temperature of 40–45° C. The precipitated base salt of the sulphuric acid ester is separated off, and heated in a solution of 4 parts of sodium hydroxide in 130 parts of water and 50 parts of alcohol for 30 minutes at 45–55° C. The solution is filtered and concentrated, and by the addition of sodium chloride the sodium salt of the sulphuric acid ester of leuco-1:5-dibenzoylaminoanthraquinone is obtained in a yield of 90 percent.

EXAMPLE 16

10 parts of chlorosulphonic acid are introduced dropwise into a mixture of 18 parts of α-picoline and 25.5 parts of N-isopropyl-2-methylpiperidine, while cooling and stirring. 5 parts of 1:4-dibenzoylaminoanthraquinone and 8 parts of brass powder are added, and the whole is heated at 50–55° C. until the dyestuff disappears, which takes about 3 hours. By working up as described in Example 15 there is obtained the sodium salt of the sulphuric acid ester of 1:4-dibenzoylaminoanthraquinone in a yield of 90 percent.

EXAMPLE 17

10 parts of chlorosulphonic acid are introduced into 80 parts of 2-methyl-5-ethyl-pyridine, while cooling and stirring. After the addition of 8 parts of brass powder, the whole is stirred for 30 minutes at 18–20° C., and then 28 parts of N-3-amyl-piperidine and subsequently 5 parts of 1:4-dibenzoyl-aminoanthraquinone are added while cooling. The whole is heated at 55–57° C. until the dyestuff disappears, which takes about one hour.

By working up as described in Example 7 there is obtained the sodium salt of the sulphuric acid ester of 1:4-dibenzoyl-aminoanthraquinone in a yield of 93 percent.

EXAMPLE 18

10 parts of chlorosulphonic acid are introduced into 80 parts of α-picoline while cooling and stirring. After the addition of 8 parts of copper powder the whole is stirred for 30 minutes at 18–20° C. 30.5 parts of N-4-heptyl-pyrrolidine and subsequently 5 parts of 1:4-dibenzoyl-aminoanthraquinone are added while cooling. The whole is heated to 40° C. until the dyestuff disappears, which takes about ½ hour.

By working up as described in Example 15 there is obtained the sodium salt of the sulphuric acid ester of leuco-1:4-dibenzoylaminoanthraquinone in a yield of 90 percent.

EXAMPLE 19

10 parts of chlorosulphonic acid and subsequently 30.5 parts of N-4-heptyl-pyrrolidine are introduced into 80 parts of α-picoline while cooling and stirring. After the addition of 5 parts of carbazolised di-(5'-benzoylamino-1'-anthraquinonyl)ester-2:8-diaminochrysene, there are added in portions 3 parts of zinc powder at a temperature of 20–25° C. When the dyestuff has disappeared the excess of zinc is filtered off, and the filtrate is introduced into a solution of 18 parts of sodium carbonate in 500 parts of water. The bases are distilled off under reduced pressure at a bath temperature of 40–45° C. The base salt of the sulphuric acid ester which precipitates is separated and worked up as described in Example 15. There is obtained the sodium salt of the sulphuric acid ester of leuco-(5'-benzoylamino-1'-anthraquinonyl)-2:8-diaminochrysene in a yield of 95 percent.

EXAMPLE 20

10 parts of chlorosulphonic acid are introduced into 207 parts of α-picoline, while cooling and stirring. After the addition of 8 parts of brass powder the whole is stirred for 20 minutes at 18–20° C. and there are subsequently added, while cooling, 23 parts of N-isopropylpiperidine followed by 5 parts of 1-(4'-dimethylsulphonamidobenzoylamino)-4-benzoylaminoanthraquinone, and the whole is heated at 45–50° C. until the dyestuff disappears, which takes about one hour.

By working up as described in Example 15 there is obtained the sodium salt of the sulphuric acid ester of leuco - (4' - dimethylsulphonamido - benzoylamino) - 4 - benzoylamino-anthraquinone in a yield of 75 percent.

EXAMPLE 21

10 parts of chlorosulphonic acid are introduced into 80 parts of α-picoline, while cooling and stirring. After the addition of 8 parts of brass powder, the whole is stirred for 30 minutes at 18-20° C. 23 parts of N-isopropyl-pyridine and subsequently 5 parts of the anthrimide of 1:3-dichloro-2-methyl-anthraquinone and 1:4-monobenzoyldiaminoanthraquinone are added while cooling. The whole is heated at 55-57° C. until the dyestuff disappears, which takes about 3 hours. By working up in accordance with Example 7 there is obtained from the reaction mixture the sodium salt of the sulphuric acid ester of the aforesaid anthrimide in a yield of 60 percent.

In the following table are given further tertiary amines and pyridine bases which may be used.

*Table II*

| Base of the formula: $X\!\!-\!\!\underset{R_3}{\underset{|}{\overset{R_4}{\overset{|}{N-CH}}}}$ | Pyridine base | Vat Dyestuff | Metal Yield, percent |
|---|---|---|---|
| N-Isopropyl-piperidine | α-picoline | I | Fe, 68 |
| Do | do | II | Fe, 91 |
| N-Isopropyl-2-methylpiperidine | do | II | Cu, 93 |
| N-sec. butylpiperidine | pyridine | II | Cu, 77 |
| Do | α-picoline | V | Me, 90 |
| N-3-amylpiperidine | pyridine | I | Me, 62 |
| Do | α-picoline | II | Co, 87 |
| N-4-heptylpyrrolidine | α-picoline, β-picoline, 1:1. | II | Me, 85 |
| N - isopropyl - piperidine, N- 3-amylpiperidine, 1:1. | α-picoline, 2:4-lutidine, 1:1. | II | Me, 86 |

EXAMPLE 22

10 parts of chlorosulphonic acid are introduced into 80 parts of α-picoline while cooling and stirring. After the addition of 8 parts of brass powder the whole is heated for 20 minutes at 15-20° C. 30.3 parts of N-n-butyl-2:6-dimethyl-piperidine and subsequently 5 parts of 1:5-dibenzoylaminoanthraquinone are added, while cooling. The whole is heated at 55-57° C. until the dyestuff disappears, which takes about 3 hours. The reaction mixture is worked up as follows.

It is introduced into a solution of 18 parts of sodium carbonate in 500 parts of water and the bases are distilled off under reduced pressure at a bath temperature of 40-45° C. The precipitated base salt of the sulphuric acid ester is separated and heated in a solution of 4 parts of sodium hydroxide in 130 parts of water and 50 parts of alcohol for 30 minutes at 50° C.

The solution is filtered and concentrated, and by the addition of sodium carbonate the sodium salt of the sulphuric acid ester of leuco-1:5-dibenzoylaminoanthraquinone is obtained in a yield of 89 percent.

EXAMPLE 23

10 parts of chlorosulphonic acid are introduced into a mixture of 103 parts of pyridine and 103 parts of α-picoline, while cooling and stirring. After adding 8 parts of brass powder the whole is stirred for 30 minutes at 18-20° C. 23 parts of N-methyl-2:6-dimethyl-piperidine followed by 5 parts of 1:4-dibenzoylaminoanthraquinone are added while cooling. The whole is heated at 40° C. until the dyestuff disappears, which takes about 30 minutes.

By working up according to Example 22 there is obtained the sodium salt of the sulphuric acid ester of leuco-1:4-dibenzoylaminoanthraquinone in a yield of 71 percent.

EXAMPLE 24

10 parts of chlorosulphonic acid are added dropwise to a mixture of 20.2 parts of α-picoline and 30.3 parts of N-n-butyl-2:6-dimethyl-piperidine, while cooling and stirring. 5 parts of 1:4-dibenzoylaminoanthraquinone and 8 parts of brass powder are added and the whole is heated at 55-57° C. until the dyestuff disappears, which takes about 2 hours.

By working up according to Example 22 there is obtained the sodium salt of sulphuric acid ester of 1:4-dibenzoylaminoanthraquinone in a yield of 90 percent.

EXAMPLE 25

10 parts of chlorosulphonic acid are introduced into 80 parts of α-picoline, while stirring and cooling. After the addition of 13 parts of iron powder, the whole is stirred for 30 minutes at 18-20° C. 25.2 parts of N-n-propyl-2-methylpiperidine followed by 5 parts of carbazolised di-(5' - benzoylamino - 1' - anthraquinonyl) - 2:8 - diaminochrysene are added while cooling. The whole is heated at 55-57° C. until the dyestuff disappears, which takes about 5 hours.

By working up according to Example 22 there is obtained the sodium salt of the sulphuric acid ester of di-(5'-benzoylamino - 1' - anthraquinonyl) - 2:8 - diaminochrysene in a yield of over 90 percent.

By using in this example, instead of the said dyestuff, 5 parts of 1:4-dibenzoylaminoanthraquinone or 5 parts of the anthrimide of 1:3-dichloro-2-methyl-anthraquinone and 1:4-monobenzoyl-diaminoanthraquinone, the sodium salt of the sulphuric acid ester of leuco 1:4-dibenzoylamino anthraquinone or the leuco compound of the said anthrimide is obtained in a yield of 98 percent or 70 percent, respectively.

EXAMPLE 26

12.5 parts of N-ethyl-2:6-piperidine are introduced into 50 parts of α-picoline while stirring and cooling. After the addition of 5 parts of carbazolised 8':8''-dibenzoylamino-1:4-1':2''-trianthrimide there are added in portions 3 parts of zinc powder and the whole is maintained at 30-33° C. When the dyestuff has disappeared, which takes about 2 hours, the excess of zinc is filtered off with suction and the reaction mixture is introduced into a solution of 22 parts of sodium carbonate in 500 parts of water. The bases are distilled off under reduced pressure at a bath temperature of 40-45° C. The base salt of the sulphuric acid ester so precipitated is separated off and heated in a solution of 4 parts of sodium hydroxide in 130 parts of water and 50 parts of alcohol for one hour at 50-55° C.

The solution is filtered and concentrated, and by the addition of sodium chloride the sodium salt of the sulphuric acid ester of leuco - 8':8'' - dibenzoylamino-1:4:1':1''-trianthrimide is obtained in a yield of 76 percent.

By using in this example 80 parts of α-picoline, 10 parts of chlorosulphonic acid and, instead of N-ethyl-2:6-dimethyl-piperidine, 28 parts of N-n-propyl-2-methyl-piperidine, the sodium salt of the sulphuric acid ester of leuco - 8':8'' - dibenzoylamino - 1:4:1':1'' - trianthrimide is obtained in a yield of 70 percent.

EXAMPLE 27

10 parts of chlorosulphonic acid are introduced dropwise into 80 parts of α-picoline. After the addition of 13 parts of iron powder, the whole is stirred for 30 minutes at 18-20° C. 23 parts of N-ethyl 2-methyl-piperidine and subsequently 5 parts of 1-(4'-dimethylsulphonamido-benzoylamino)-4-benzoylamino anthraquinone are added while cooling. The whole is heated at 55-57° C. until the dyestuff disappears, which takes about 3 hours.

By working up according to Example 22, there is obtained the sodium salt of the sulphuric acid ester of leuco 1 - (4' - dimethylsulphonamido-benzoylamino) - 4-benzoylaminoanthraquinone in a yield of 85%.

Further examples of starting materials and the results obtained therewith are given in the following table:

Table III

| Base of the formula $R_1\underset{X}{\overset{R_4}{\diagdown}}N{-}CH$ | Pyridine Base | Vat dyestuff | Metal | Yield, percent |
|---|---|---|---|---|
| N-methyl-2:6-dimethyl-piperidine | Pyridine | I | Fe | 70 |
| N-ethyl-2-methyl-piperidine | α-picoline | II | Cu | 93 |
| Do | do | I | Me | 64 |
| N-Ethyl-2:6-dimethyl-piperidine | do | II | Cu | 92 |
| Do | do | I | Me | 87 |
| Do | do | III | Fe | 74 |
| N-n propyl-2-methyl-piperidine | do | II | Co | 67 |
| Do | Pyridine | I | Fe | 62 |
| N-n-propyl-2-methyl-piperidine, N-n-butyl-2-methyl-piperidine, N-Ethyl-2:6-dimethyl-piperidine, 1:1:1. | α-picoline | II | Me | 91 |
| N-n Butyl-2:6-dimethyl-piperidine | pyridine, 2:4-lutidine, 2:6-lutidine, in ratio 2:3:3. | II | Me | 90 |

EXAMPLE 28

10 parts of chlorosulphonic acid are introduced into 80 parts of α-picoline while cooling and stirring. After the addition of 7 parts of brass powder the whole is stirred for 30 minutes at 18–20° C. and 30.5 parts of N-ethyl-n-propylcyclohexylamine followed by 5 parts of 1:5-dibenzoylaminoanthraquinone are added while cooling. The whole is heated at 55–57° C. until the dyestuff disappears, which takes about 1 hour.

The reaction mixture is worked up as follows:

It is introduced into a solution of 18 parts of sodium carbonate in 500 parts of water and the bases are distilled off under reduced pressure at a bath temperature of 40–45° C. The precipitated ethyl-propyl-cyclohexylamine salt of the sulphuric acid ester is separated and heated in a solution of 4 parts of sodium hydroxide in 130 parts of water and 50 parts of alcohol for 30 minutes at 40° C. while stirring. The liberated base is distilled off under reduced pressure and by the addition of sodium chloride to the clarified solution the sodium salt of the sulphuric acid ester of leuco 1-5-dibenzoylaminoanthraquinone is precipitated. The yield amounts to 89%.

EXAMPLE 29

10 parts of chlorosulphonic acid are introduced into 80 parts of α-picoline while cooling and stirring. After the addition of 13 parts of iron powder the whole is stirred for 30 minutes at 18–20° C. and then 30.5 parts of N-ethyl-isopropyl-cyclohexylamine followed by 5 parts of 1:4 dibenzoylaminoanthraquinone are added while cooling. The whole is heated at 50–55° C. until the dyestuff disappears, which takes 2–3 hours.

By working up according to Example 28, there is obtained the sodium salt of the sulphuric acid ester of leuco-1:4-dibenzoylaminoanthraquinone in a yield of 90%.

By using in this example instead of N-ethyl-isopropyl-cyclohexylamine the same quantity of N-ethyl-n-propyl-cyclohexylamine, there is obtained the sodium salt of the sulfuric acid ester of leuco-1:4-dibenzoylaminoanthraquinone in a yield of 89%.

EXAMPLE 30

33 parts of an isomeric mixture of N-ethyl-n-propyl-2-methylcyclohexylamine followed by 10 parts of chlorosulphonic acid are added to 21.4 parts of α-picoline while cooling and stirring. 8 parts of brass powder and 5 parts of 1:4-dibenzoylaminoanthraquinone are added and the whole is heated at 40–45° until the dyestuff disappears, which takes about 2 hours.

By working up according to Example 28, there is obtained the sodium salt of the sulphuric acid ester of leuco 1:4-dibenzoylaminoanthraquinone in a yield of 90%.

EXAMPLE 31

10 parts of chlorosulphonic acid are added to 297 parts of α-picoline while cooling and stirring. After the addition of 8 parts of brass powder the whole is stirred for 30 minutes at 18–20° C. 30.6 parts of an isomeric mixture of N-methyl-n-propyl-3-methyl-cyclohexylamine followed by 5 parts of 1-(4'-dimethylsulphonamido-benzoylamino) - 4 - benzoylaminoanthraquinone are added while cooling and stirring, and the whole is heated at 40–45° C. until the dyestuff disappears, which takes about 1 hour.

By working up according to Example 28 the sodium salt of the sulphuric acid ester of leuco-1-(4'-dimethylsulphonamido - benzoylamino) - 4 - benzoylaminoanthraquinone is obtained in a yield of over 70%.

EXAMPLE 32

10 parts of chlorosulphonic acid are introduced into 80 parts of α-picoline while cooling and stirring. After the addition of 8 parts of brass powder the whole is heated for 20 minutes at 18–20° C. 33 parts of an isomeric mixture of N-ethyl-isopropyl-4-methyl-cyclohexylamine followed by 5 parts of carbazolised di-(5'-benzoylamino - 1' - anthraquinonyl) - 2:8 - diamino chrysene are added while cooling and stirring. The whole is heated at 55–75° until the dyestuff disappears, which takes about 3 hours. The reaction mixture is introduced into a solution of 18 parts of sodium carbonate in 500 parts of water and the bases are distilled off at a reduced pressure at a bath temperature of 40–45° C. The precipitated base salt of the sulphuric acid ester is separated and stirred for 45 minutes in a solution of 4 parts of sodium hydroxide in 130 parts of water and 50 parts of alcohol at 50–55° C.

The solution is filtered and concentrated, and by adding sodium chloride the sodium salt of the sulphuric acid ester of di-(5'-benzoylamino-1'-anthraquinonyl-2:8-diamino chrysene is precipitated in a yield of 95%.

EXAMPLE 33

10 parts of chlorosulphonic acid followed by 37 parts of N-n-propyl-n-butyl-3-methyl-cyclohexylamine are introduced into 80 parts of α-picoline while cooling and stirring. After the addition of 5 parts of carbazolised 8':8"-dibenzoylamino-1:4:1':1"-trianthrimide, 5 parts of zinc powder are added in portions and the temperature is maintained at 30–33° C. When the dyestuff has disappeared the excess of zinc is filtered off, and the filtrate is introduced into a solution of 18 parts of sodium carbonate in 500 parts of water. The bases are distilled off under reduced pressure at a bath temperature of 40–45° C. The base-salt of the sulphuric acid ester so precipitated is separated and heated in a solution of 4 parts of sodium hydroxide in 150 parts of water and 50 parts of alcohol at 50–55° C.

The solution is filtered and concentrated, and by the addition of sodium chloride, the sodium salt of the sulphuric acid ester salt of leuco-8':8"-benzoylamino-1:4:1':1"-trianthrimide is obtained in a yield exceeding 55%.

EXAMPLE 34

10 parts of chlorosulphonic acid are introduced into 80 parts of α-picoline while cooling and stirring. After the addition of 8 parts of brass powder the whole is stirred for 30 minutes at 18–20° C. 28 parts of N-methyl-isopropyl-cyclohexylamine followed by 5 parts of the anthrimide from 1:3-dichloro-2-methyl-anthraquinone, and 1:4-monobenzoyl-diamino-anthraquinone (prepared as described in the first paragraph of Example 1 of French specification No. 857,987) are added while cooling. The whole is heated at 55–57° C. until the dyestuff disappears, which takes 2–3 hours.

By working up according to Example 28 there is obtained from the reaction mixture the sodium salt of the sulphuric acid ester of the leuco compound of the anthrimide from 1:3-dichloro-2-methyl-anthraquinone and 1:4-monobenzoyl-diamino anthraquinone in a yield of 78%.

EXAMPLE 35

10 parts of chlorosulphonic acid are introduced into 80 parts of α-picoline while cooling and stirring. After the addition of 7 parts of brass powder the whole is stirred for 30 minutes at 18–20° C. and then 40.2 parts of N-dicyclohexyl-n-propylamine followed by 5 parts of 1:5-dibenzoylamino anthraquinone are added while cooling. The whole is heated to 55–57° C. until the dyestuff disappears, which takes about 1½ hours.

The reaction mixture is worked up as follows:

It is introduced into a solution of 18 parts of sodium carbonate in 500 parts of water, and the bases are partially distilled off under reduced pressure at a bath temperature of 40–45° C. The viscous oil which separates out is removed from the salt solution and heated in a solution of 4 parts of sodium hydroxide in 130 parts of water and 40 parts of alcohol for 30 minutes at 40° C. By extracting the filtered solution with benzene the bases are removed, and by the addition of sodium chloride the sodium salt of the sulphuric acid ester of leuco-1:5-dibenzoylamino-anthraquinone is precipitated in a yield of 90%.

EXAMPLE 36

10 parts of chlorosulphonic acid are introduced into 239 parts of α-picoline, while cooling and stirring. After the addition of 8 parts of brass powder the whole is stirred for 20 minutes at 18–20° C. and then 37.6 parts of N-cyclohexyl-3-methyl-cyclohexyl methylamine followed by 5 parts of 1:4-dibenzoylamino anthraquinone are added while cooling. The whole is heated at 40–45° C. until the dyestuff disappears, which takes about 30 minutes.

By working up according to Example 35, the sodium salt of the sulphuric acid ester of 1:4-dibenzoylamino anthraquinone is obtained in a yield of 90%.

EXAMPLE 37

10 parts of chlorosulphonic acid are introduced into 80 parts of α-picoline while cooling and stirring. After the addition of 13 parts of iron powder the whole is stirred for 30 minutes at 18–20° C., and then 45.2 parts of an isomeric mixture of N-cyclohexyl-4-methyl cyclohexyl-n-butylamine followed by 5 parts of 1:4-dibenzoylamino anthraquinone are added while cooling. The whole is heated until the dyestuff disappears, which takes about 1 hour.

By working up according to Example 35 there is obtained the sodium salt of the sulphuric acid ester of leuco-1:4-dibenzoylamino anthraquinone in a yield of 86%.

EXAMPLE 38

10 parts of chlorosulphonic acid are added dropwise to a mixture of 25 parts of α-picoline and 37.6 parts of N-dicyclohexyl-ethylamine, while cooling and stirring. After the addition of 8 parts of brass powder and 5 parts of 1:4-dibenzoylamino anthraquinone the whole is heated at 40–45° C. until the dyestuff disappears, which takes about 6 hours.

By working up according to Example 35 the sodium salt of the sulphuric acid ester of leuco-1:4-dibenzoylamino anthraquinone is obtained in a yield of 60%.

EXAMPLE 39

10 parts of chlorosulphonic acid are introduced into a mixture of 20 parts of α-picoline, 30 parts of 2:4-lutidine and 30 parts of 2:6-lutidine while cooling and stirring. After the addition of 8 parts of brass powder, the whole is stirred for 30 minutes at 18–20° C. and then 37.7 parts of an isomeric mixture of cyclohexyl-3-methylcyclohexyl-methylamine, followed by 5 parts of 1-(4'-dimethyl sulphonamido - benzoylamino) - 4 - (4''- chlorobenzoylamino)-anthraquinone are added while cooling. The whole is heated at 40–45° C. until the dyestuff disappears, which takes about 2 hours.

By working up according to Example 35 the sodium salt of the sulphuric acid ester of leuco-1-(4'-dimethyl sulphonamido - benzoylamino) - 4 - (4''- chlorobenzoylamino)-anthraquinone is obtained in a yield of 77%.

EXAMPLE 40

10 parts of chlorosulphonic acid are introduced into 80 parts of pyridine while cooling and stirring. After the addition of 8 parts of cobalt powder the whole is stirred for 30 minutes at 18–20° C., and then 40.2 parts of N-dicyclohexyl-n-propylamine followed by 5 parts of carbazolised di-(5'-benzoylamino-1'-anthraquinonyl)-2:8-diamino-chrysene are added while cooling. The whole is heated to 55–57° C. until the dyestuff disappears, which takes about 5 hours.

By working up according to Example 35, except that by splitting up the base salt of the sulphuric acid ester with dilute caustic soda solution the temperature is raised to 50–55° C., there is obtained the sodium salt of the

*Table IV*

| Base of the formula $\begin{matrix} R_1 \\ \diagdown \\ \diagup \\ R_2 \end{matrix} N-\overset{\frown}{C}H\ X$ | Pyridine base | Vat dyestuff | Metal | Yield, percent |
|---|---|---|---|---|
| N-methyl-ethyl-cyclohexylamine | α-picoline | III | Cu | 82 |
| N-methyl-n-propyl-cyclohexylamine | do | II | Fe | 78 |
| N-methyl-n-propyl-3-methylcyclohexylamine | do | I | Co | 59 |
| N-methyl-isopropyl-cyclohexylamine | Pyridine | I | Me | 88 |
| N-methyl-isopropyl-2-methylcyclohexylamine | 2:4-lutidine, 2:6-lutidine, 1:1 | II | Me | 93 |
| N-methyl-isopropyl-3-methylcyclohexylamine | α-picoline, β-picoline, γ-picoline, 1:1:1 | II | Me | 85 |
| N-ethyl-Isopropyl-4-methylcyclohexylamine | β-picoline, γ-picoline, 1:1 | II | Me | 71 |
| Do | pyridine | III | Fe | 72 |
| N-di-n-propyl-2-methyl-cyclo-hexylamine | do | III | Fe | 76 |
| N-n-propyl-isopropyl-cyclohexyl-amine | α-picoline | II | Fe | 91 |
| N-n-propyl-n-butyl-3-methyl-cyclohexylamine | do | II | Fe | 92 |
| Do | 2-methyl-5-ethylpyridine | II | Me | 87 |
| N-n-butyl-isopropyl-cyclohexyl-amine | α-picoline | II | Me | 92 |
| N - methyl - isopropyl - 2 - methyl - cyclohexyl - amine. N - methyl - n - propyl - 3 - methyl - cyclohexylamine, N - ethyl - n - propyl - 3 - methyl - cyclohexylamine, 1:1:1. | do | II | Me | 93 |
| N-dicyclohexyl-methylamine | do | II | Me | 91 |
| Do | do | II | Me | 86 |
| N-dicyclohexyl-ethylamine | pyridine, α-picoline, 1:1 | III | Me | 59 |
| Do | α-picoline | VII | Fe | 55 |
| N-dicyclohexyl-n-propylamine | do | II | Fe | 90 |
| Do | do | I | Fe | 87 |
| Do | 2-methyl-5-ethylpyridine | II | Me | 86 |
| N-cyclohexyl-3-methylcyclohexyl-n-propylamine | α-picoline | II | Zn | 60 | sulphuric acid ester of leuco-di-(5'-benzoylamino-1'-anthraquinonyl)-2:8-diamino-chrysene in a yield of 70%.

EXAMPLE 41

10 parts of chlorosulphonic acid, and then 40.2 parts of N-dicyclohexyl-n-propylamine are introduced into 80 parts of α-picoline, while cooling and stirring. After the addition of 5 parts of carbazolised 8':8''-dibenzoylamino-1:4:1':1''-trianthrimide 3 parts of zinc powder are added in portions and the temperature is maintained at 30-35° C. When the dyestuff has disappeared the excess of zinc is filtered off and the filtrate is introduced into a solution of 18 parts of sodium carbonate in 500 parts of water. The bases are distilled off under reduced pressure at a bath temperature of 40-45° C. The base salt of the sulphuric acid ester thus precipitated is separated, and heated in a solution of 4 parts of sodium hydroxide in 150 parts of water and 50 parts of alcohol at 50-55° C.

After extracting the solution with benzene, there is obtained therefrom by the addition of sodium chloride the sodium salt of the sulphuric acid ester of 8':8''-dibenzoylamino-1:4-1':1''-trianthrimide in a yield of 60%.

EXAMPLE 42

10 parts of chlorosulphonic acid are introduced into 80 parts of pyridine, while cooling and stirring. After the addition of 13 parts of iron powder, the whole is stirred for 30 minutes at 18-20° C. and then, while cooling, 28 parts of cyclopentyl-piperidine followed by 5 parts of 1:5-dibenzoylaminoanthraquinone are added. The whole is heated at 55-57° C. until the dyestuff disappears, which takes 1½-2 hours.

The reaction mixture is worked up as follows: It is introduced into a solution of 18 parts of sodium carbonate in 500 parts of water, and the bases are distilled off under reduced pressure at a bath temperature of 40-45° C. The precipitated N-cyclopentyl-piperidine salt of the sulphuric acid ester is separated, and then heated in a solution of 4 parts of sodium hydroxide in 130 parts of water and 50 parts of alcohol for about ½ hour at 40-50° C. The base liberated is distilled off under reduced pressure, the solution is filtered to remove insoluble matter, the filtrate is then rendered slightly acid with dilute hydrochloric acid, filtered, rendered alkaline with dilute caustic soda solution, and by the addition of sodium chloride the sodium salt of the sulphuric acid ester of 1:5-dibenzoylaminoanthraquinone is obtained in a yield of 73%.

EXAMPLE 43

10 parts of chlorosulphonic acid are introduced, while cooling and stirring, into a mixture of 20.1 parts of α-picoline and 30.2 parts of N-cyclopentyl-2-methyl-piperidine. 5 parts of 1:4-dibenzoylaminoanthraquinone and 8 parts of brass powder are added, and the whole is heated at 55-57° C. until the dyestuff disappears, which takes about 2 hours.

The reaction mixture is worked up as follows: It is introduced into a solution of 18 parts of sodium carbonate in 500 parts of water and the bases are distilled off under reduced pressure at a bath temperature of 50-55° C. The precipitated base salt of the sulphuric acid ester is separated and heated in a solution of 4 parts of sodium hydroxide in 130 parts of water and 50 parts of alcohol for about 30 minutes at 40-45° C. After removing the residues of metal by filtering with suction, the precipitated base is removed by extraction with benzene or ether, and by the addition of sodium chloride the sodium salt of the sulphuric acid ester of 1:4-dibenzoylaminoanthraquinone is precipitated in a yield of 92%.

EXAMPLE 44

10 parts of chlorosulphonic acid are introduced into 80 parts of α-picoline while stirring and cooling. After the addition of 8 parts of brass powder, the whole is stirred for 30 minutes at 18-20° C. Then 15.1 parts of cyclohexyl-piperidine and 13.9 parts of cyclohexyl-pyrrolidine and subsequently 5 parts of 1:4-dibenzoylaminoanthraquinone are added, these additions being made while cooling. The whole is heated until the dyestuff disappears, which takes about 1 hour.

By working up according to Example 43, the sodium salt of the sulphuric acid ester of leuco-1:4-dibenzoylaminoanthraquinone is obtained in a yield of 89%.

EXAMPLE 45

10 parts of chlorosulphonic acid are introduced into 80 parts of α-picoline while cooling and stirring. After the addition of 8 parts of brass powder, the whole is stirred at 18-20° C. for 30 minutes. There are then added, while cooling, 27.8 parts of n-cyclohexyl-pyrrolidine followed by 5 parts of carbazolised di-(5-benzoylamino-1'-anthraquinonyl)-2:8-diaminochrysene. The whole is heated at 50° C. until the dyestuff disappears, which takes about 3 hours.

By working up according to Example 43, except that the base salt of the sulphuric acid ester is heated at 50-55° C. in an aqueous alcoholic solution of caustic soda, the sodium salt of the sulphuric acid ester of the leuco compound of carbazolised di-(5-benzoylamino-1'-anthraquinonyl)-2:8-diaminochrysene is obtained in a yield of 90%.

EXAMPLE 46

10 parts of chlorosulphonic acid are introduced into 272 parts of α-picoline while cooling and stirring. After the addition of 8 parts of brass powder the whole is heated for 30 minutes at 18-20° C. There are then added, while cooling, 30.2 parts of cyclohexyl-piperidine followed by 5 parts of 1-(4'-dimethylsulphonamido-benzoylamino)-4-benzoylaminoanthraquinone, and the whole is heated at 50-55° C. until the dyestuff disappears, which takes 1½-2 hours.

By working up according to Example 43 there is obtained the sodium salt of the sulphuric acid ester of leuco-1-(4'-dimethylsulphonamido-benzoylamino)-4-benzoylaminoanthraquinone in a yield of 83%.

EXAMPLE 47

10 parts of chlorosulphonic acid are introduced into 80 parts of α-picoline while stirring and cooling. After the addition of 8 parts of brass powder the whole is stirred for 30 minutes at 18-20° C. There are then added, while cooling, 30.2 parts of N-cyclopentyl-2-methylpiperidine followed by 5 parts of carbazolysed 8':8''-dibenzoylamino-1:4-1':1''-trianthrimide, and the whole is heated at 50° C. until the dyestuff disappears, which takes 5-6 hours.

By working up according to Example 45, the sodium salt of the sulphuric acid ester of the leuco compound of carbazolised 8':8''-dibenzoylamino-1:4-1':1''-trianthrimide is obtained in a yield of 67%.

EXAMPLE 48

10 parts of chlorosulphonic acid are intriduced into 80 parts of α-picoline while cooling and stirring. After the addition of 8 parts of brass powder the whole is heated for 30 minutes at 18-20° C. There are added, while cooling, 27.8 parts of cyclohexyl-piperidine followed by 5 parts of the anthrimide obtained from 1:3-dichloro-2-methylanthraquinone and 1:4-monobenzoylaminoanthraquinone. The whole is heated at 50° C. until the dyestuff disappears, which takes about 3 hours.

By working up as described in Example 45, there is obtained the sodium salt of the sulphuric acid ester of the leuco compound of the anthrimide obtained from 1:3-dichloro-2-methylanthraquinone and 1:4-monobenzoyldi-aminoanthraquinone in a yield of 90%.

Table V

| Base of the formula 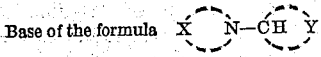 | Pyridine base | Vat Dyestuff | Metal | Yield, percent |
|---|---|---|---|---|
| N-cyclopentyl-2-methylpiperidine | α-picoline | I | Zn | 74 |
| Do | do | II | Zn | 93 |
| N-cyclohexyl-piperidine | 2:4-lutidine | II | Me | 84 |
| Do | α-picoline | VI | Zn | 65 |
| Do | pyridine, α-picoline, β-picoline, 2-methyl-5-ethylpyridine in the ratio 1:1:1:1. | II | Me | 83 |
| N-4-methylcyclohexylpiperidine | α-picoline | II | Co | 78 |
| N-3-methylcyclohexyl-2-methyl-piperidine | do | II | Me | 92 |
| N-4-methylcyclohexyl-2-methyl-piperidine | do | III | Me | 88 |
| N-cyclohexyl-pyrrolidine | do | II | Fe | 79 |
| N-3-methylcyclohexyl-pyrrolidine | do | III | Fe | 59 |
| N-4-methylcyclohexyl-pyrrolidine | do | II | Me | 85 |

The present application is in part a continuation of copending application Serial No. 357,894, filed May 27, 1953, which is itself a continuation in part of patent application Serial No. 319,174, filed November 6, 1952, which also is itself a continuation in part of patent application Serial No. 212,834 of February 26, 1951 (now severally abandoned).

What we claim is:

1. A process for the manufacture of a water-soluble salt of a sulphuric acid ester of a leuco vat dyestuff of the anthraquinone series, which dyestuff gives an ester yield of less than 25% relative to the weight thereof when esterified by means of a mixture of pyridine base and chlorosulphonic acid (10:1 by weight) in the presence of a metal powder, comprising reacting the vat dyestuffs in the presence of at least one finely divided metal, selected from the group consisting of iron, cobalt, zinc, copper and copper alloys with a member of the group consisting of chlorosulphonic acid and an equivalent mixture of sulphur trioxide and hydrogen chloride in the presence of a mixture consisting of at least one pyridine base selected from the group consisting of pyridine, α-, β- and γ-picoline, 2:4- and 2:6-lutidine, 2-methyl-5-ethyl-pyridine, and of at least one tertiary amine of the general formula

in which all the four free valences are occupied by carbon atoms of radicals selected from the group consisting of monovalent saturated hydrocarbon radicals each occupying any one of the said free valences and of divalent saturated hydrocarbon radicals having two end carbon atoms occupying any one pair of the said free valences, any of the said monovalent and divalent saturated hydrocarbon radicals which are bound solely to the nitrogen atom each containing at most seven carbon atoms and any two monovalent radicals so bound containing together at least three and at most eleven carbon atoms, any of the said monovalent and divalent saturated hydrocarbon radicals which are bound solely to the carbon atom of the formula each containing at most six carbon atoms and any two monovalent radicals so bound containing together at least two and at most eight carbon atoms, the said pyridine base-tertiary amine mixture containing 10–60 percent by weight of tertiary amine component, and subsequently converting the resulting sulphuric acid ester compound into a water-soluble ester salt.

2. A process for the manufacture of a water-soluble salt of a sulphuric acid ester of a leuco vat dyestuff of the anthraquinone series, which dyestuff gives an ester yield of less than 25% relative to the weight thereof when esterified by means of a mixture of pyridine base and chlorosulphonic acid (10:1 by weight) in the presence of a metal powder, comprising reacting the vat dyestuffs in the presence of at least one finely divided metal, selected from the group consisting of iron, cobalt, zinc, copper and copper alloys with a member of the group consisting of chlorosulphonic acid and an equivalent mixture of sulphur trioxide and hydrogen chloride in the presence of a mixture consisting of at least one pyridine base selected from the group consisting of pyridine, α-, β- and γ-picoline, 2:4- and 2:6-lutidine, 2-methyl-5-ethylpyridine, and of at least one tertiary amine of the general formula $$\diagdown N\!-\!CH\diagup$$

in which all the four free valences are occupied by carbon atoms of radicals selected from the group consisting of monovalent saturated hydrocarbon radicals each occupying any one of the said free valences and of divalent saturated hydrocarbon radicals having two end carbon atoms occupying any one pair of the said free valences, any of the said monovalent and divalent saturated hydrocarbon radicals which are bound solely to the nitrogen atom each containing at most seven carbon atoms and any two monovalent radicals so bound containing together at least three and at most eleven carbon atoms, any of the said monovalent and divalent saturated hydrocarbon radicals which are bound solely to the carbon atom of the formula each containing at most six carbon atoms and any two monovalent radicals so bound containing together at least two and at most eight carbon atoms, the said pyridine base-tertiary amine mixture containing 15–35 percent by weight of tertiary amine component, and subsequently converting the resulting sulphuric acid ester compound into a water ester salt.

3. A process for the manufacture of a water-soluble salt of a sulphuric acid ester of a leuco vat dyestuff of the anthraquinone series, which dyestuff gives an ester yield of less than 25% relative to the weight thereof when esterified by means of a mixture of pyridine base and chlorosulphonic acid (10:1 by weight) in the presence of a metal powder, comprising reacting the vat dyestuffs in the presence of at least one finely divided metal, selected from the group consisting of iron, cobalt, zinc, copper and copper alloys with a member of the group consisting of chlorosulphonic acid and an equivalent mixture of sulphur trioxide and hydrogen chloride in the presence of a mixture consisting of at least one pyridine base selected from the group consisting of pyridine, α-, β- and γ-picoline, 2:4- and 2:6-lutidine, 2-methyl-5-ethyl-pyridine, and of at least one tertiary amine of the general formula

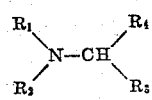

in which each $R_1$, $R_3$ and $R_4$ stands for a member selected from the group consisting of methyl, ethyl, propyl and butyl radicals and $R_2$ stands for a member selected from the group consisting of ethyl, propyl, isopropyl and butyl groups, the said pyridine base-tertiary amine mixture containing 10–60 percent by weight of tertiary amine component, and subsequently converting the resulting sulphuric acid ester compound into a water-soluble ester salt.

4. A process for the manufacture of a water-soluble salt of a sulphuric acid ester of a leuco vat dyestuff of the anthraquinone series, which dyestuff gives an ester yield of less than 25% relative to the weight thereof when esterified by means of a mixture of pyridine base and chlorosulphonic acid (10:1 by weight) in the presence of a metal powder, comprising reacting the vat dyestuffs in the presence of at least one finely divided metal, selected from the group consisting of iron, cobalt, zinc, copper and copper alloys with a member of the group consisting of chlorosulphonic acid and an equivalent mixture of sulphur trioxide and hydrogen chloride in the presence of a mixture consisting of at least one pyridine base selected from the group consisting of pyridine, α-, β- and γ-picoline, 2:4- and 2:6-lutidine, 2-methyl-5-ethyl-pyridine, and of at least one tertiary amine of the general formula

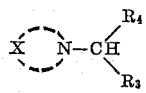

in which X stands for a member selected from the group consisting of unsubstituted and methyl-substituted pentamethylene and tetramethylene radicals and each $R_3$ and $R_4$ stands for a member selected from the group consisting of methyl, ethyl, propyl and butyl radicals, the said pyridine base-tertiary amine mixture containing 10-60 percent by weight of tertiary amine component, and subsequently converting the resulting sulphuric acid ester compound into a water-soluble ester salt.

5. A process for the manufacture of a water-soluble salt of a sulphuric acid ester of a leuco vat dyestuff of the anthraquinone series, which dyestuff gives an ester yield of less than 25% relative to the weight thereof when esterified by means of a mixture of pyridine base and chlorosulphonic acid (10:1 by weight) in the presence of a metal powder, comprising reacting the vat dyestuff in the presence of at least one finely divided metal, selected from the group consisting of iron, cobalt, zinc, copper and copper alloys with a member of the group consisting of chlorosulphonic acid and an equivalent mixture of sulphur trioxide and hydrogen chloride in the presence of a mixture consisting of at least one pyridine base selected from the group consisting of pyridine, α-, β- and γ-picoline, 2:4- and 2:6-lutidine, 2-methyl-5-ethyl-pyridine, and of at least one tertiary amine of the general formula

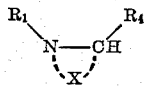

in which $R_1$ stands for a member selected from the group consisting of methyl, ethyl, propyl and butyl radicals, $R_4$ stands for a methyl group and X stands for a member selected from the group consisting of unsubstituted and methyl-substituted tetramethylene radicals, the said pyridine base-tertiary amine mixture constaining 10-60 percent by weight of tertiary amine component, and subsequently converting the resulting sulphuric acid ester compound into a water-soluble ester salt.

6. A process for the manufacture of a water-soluble salt of a sulphuric acid ester of a leuco vat dyestuff of the anthraquinone series, which dyestuff gives an ester yield of less than 25% relative to the weight thereof when esterified by means of a mixture of pyridine base and chlorosulphonic acid (10:1 by weight) in the presence of a metal powder, comprising reacting the vat dyestuff in the presence of at least one finely divided metal, selected from the group consisting of iron, cobalt, zinc, copper and copper alloys with a member of the group consisting of chlorosulphonic acid and an equivalent mixture of sulphur trioxide and hydrogen chloride in the presence of a mixture consisting of at least one pyridine base selected from the group consisting of pyridine, α-, β- and γ-picoline, 2:4- and 2:6-lutidine, 2-methyl-5-ethyl-pyridine, and of at least one tertiary amine of the general formula

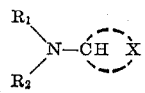

in which X stands for a member selected from the group consisting of unsubstituted and methyl-substituted pentamethylene radicals, $R_1$ stands for a member selected from the group consisting of methyl, ethyl, propyl and butyl radicals and $R_2$ stands for a member selected from the group consisting of ethyl, propyl, isopropyl, butyl and cyclohexyl radicals, the said pyridine base-tertiary amine mixture containing 10-60 percent by weight of tertiary amine component, and subsequently converting the resulting sulphuric acid ester compound into a water-soluble ester salt.

7. A process for the manufacture of a water-soluble salt of a sulphuric acid ester of a leuco vat dyestuff of the anthraquinone series, which dyestuff gives an ester yield of less than 25% relative to the weight thereof when esterified by means of a mixture of pyridine base and chlorosulphonic acid (10:1 by weight) in the presence of a metal powder, comprising reacting the vat dyestuffs in the presence of at least one finely divided metal, selected from the group consisting of iron, cobalt, zinc, copper and copper alloys with a member of the group consisting of chlorosulphonic acid and an equivalent mixture of sulphur trioxide and hydrogen chloride in the presence of a mixture consisting of at least one pyridine base selected from the group consisting of pyridine, α-, β- and γ-picoline, 2:4- and 2:6-lutidine, 2-methyl-5-ethyl-pyridine, and of at least one tertiary amine of the general formula

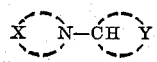

in which each X and Y stands for a member selected from the group consisting of unsubstituted and methyl-substituted pentamethylene and tetramethylene radicals, the said pyridine base-tertiary amine mixture containing 10-60 percent by weight of tertiary amine component, and subsequently converting the resulting sulphuric acid ester compound into a water-soluble ester salt.

References Cited in the file of this patent
UNITED STATES PATENTS

| | | |
|---|---|---|
| 2,563,819 | Coffey et al. | Aug. 14, 1951 |
| 2,705,717 | Oppliger | Apr. 5, 1955 |
| 2,784,198 | Peyer | Mar. 5, 1957 |
| 2,803,630 | Oppliger | Aug. 20, 1957 |

FOREIGN PATENTS

| | | |
|---|---|---|
| 315,597 | Switzerland | Aug. 31, 1956 |